United States Patent

[11] 3,609,336

| [72] | Inventor | Albert Coppola |
| | | Scarboro, Maine |
| [21] | Appl. No. | 30,904 |
| [22] | Filed | Apr. 22, 1970 |
| [45] | Patented | Sept. 28, 1971 |
| [73] | Assignee | The Eastern Company |

[54] COMPASS LIGHT
2 Claims, 4 Drawing Figs.

[52] U.S. Cl. .................................................. 240/2.1,
33/222, 116/129
[51] Int. Cl. ....................................................... G01d 11/28
[50] Field of Search ............................................ 33/204,
222, 226, 223, 222.7, 222.6; 116/124, 129; 240/2,
2.1, 8.16

[56] References Cited
UNITED STATES PATENTS

| 1,338,666 | 5/1920 | Andrews ..................... | 33/222 |
| 1,873,684 | 8/1932 | Urfer ........................... | 240/2.1 |
| 2,906,232 | 9/1959 | Le Van et al. ............... | 116/129 |
| 2,941,307 | 6/1960 | Frisbie ......................... | 33/223 |
| 3,234,657 | 2/1966 | Hull ............................. | 33/222 |
| 3,242,900 | 3/1966 | Howard ....................... | 116/124 |
| 3,502,857 | 3/1970 | Cleveland et al. ........... | 240/211 |

*Primary Examiner*—Louis J. Capozi
*Attorney*—Eckhoff and Hoppe

ABSTRACT: Means are provided in cooperative association with a transparent compass dome for illuminating the compass card mounted for rotation in a compass bowl.

PATENTED SEP 28 1971 3,609,336

INVENTOR.
ALBERT COPPOLA
BY Eckhoff and Hopf
ATTORNEYS

COMPASS LIGHT

BACKGROUND OF THE INVENTION

Heretofore it has been usual to illuminate a compass bowl with an electric light mounted on a housing which was movable over the compass dome. The illumination so provide, however, was not adequate under all conditions of use. Further, at times the illumination was such that it interfered with the vision of the helmsman.

In accordance with this invention, compass illumination means is provided which fits the compass dome snugly and provides illumination of the compass card over a substantial portion thereof so that the helmsman can observe the compass card quickly and accurately.

The illumination means of this invention is secured in position and in such relation to the bowl that the likelihood of breakage or damage is greatly reduced if not eliminated entirely.

SUMMARY OF THE INVENTION

In accordance with the present invention, compass card illuminating means is mounted snugly against the compass dome including opposite electric lights which provide illumination over approximately a third of the compass card.

It is in general a broad object of this invention to provide an improved compass card illuminating means.

A BRIEF DESCRIPTION OF THE DRAWINGS

DESCRIPTION OF THE PREFERRED EMBODIMENT

Figure 1:
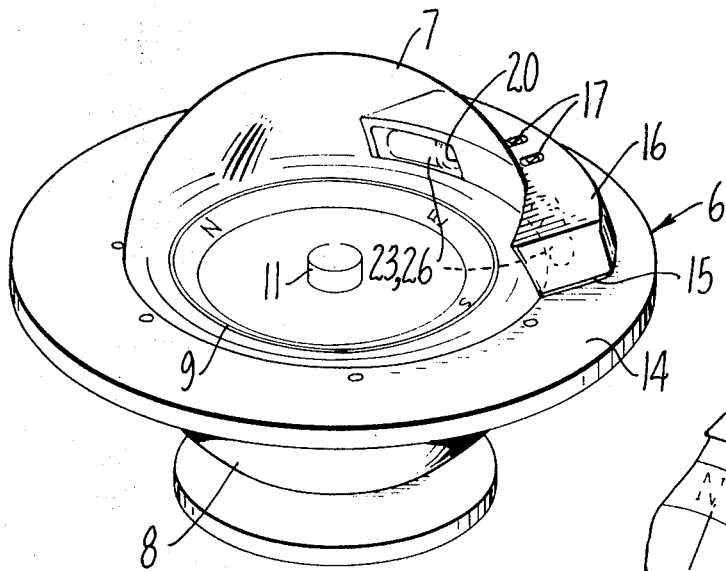
FIG. 1 is a perspective view of a compass including the illuminating means of this invention.
Figure 2:
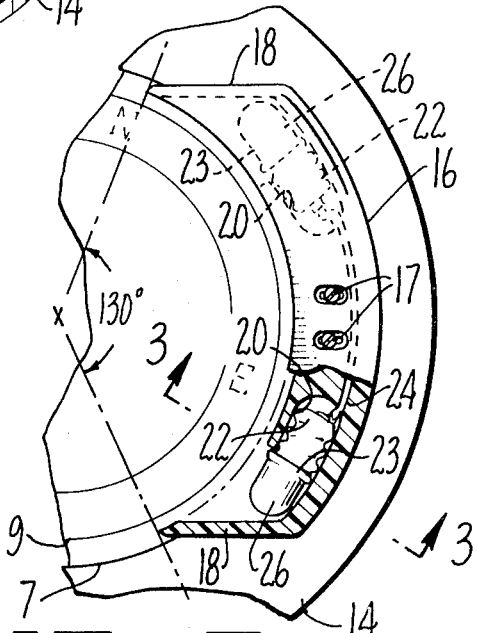
FIG. 2 is a fragmentary plan view showing the illuminating means in place on the flange surrounding the compass dome.
Figure 4:
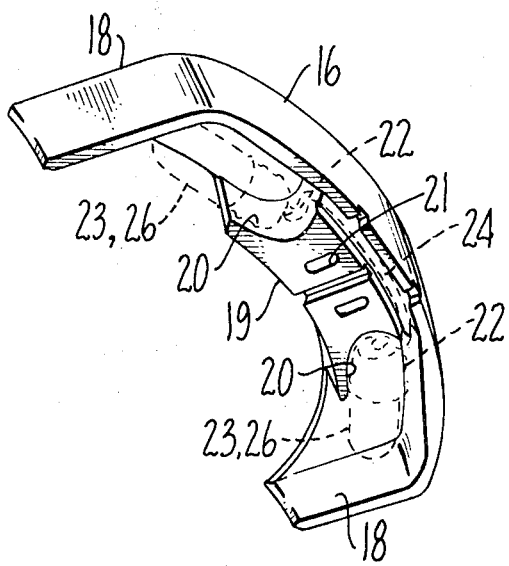
FIG. 4 is a perspective view looking at the underside of the illuminating means.
Figure 3:
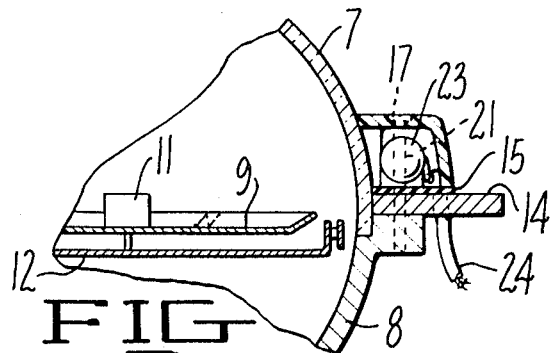
FIG. 3 is a section taken along the line 3—3 in FIg. 2.

Referring to the drawings, the compass, generally indicated at 6, includes a transparent hemispherical dome 7 mounted upon a suitable base 8. The compass includes a compass card 9 mounted upon a pivot 11 which in turn is supported by the gimbal mounted support element 12. A circular horizontal flange 14 is mounted upon the base 8 and serves to retain the compass bowl 7 in a sealed position on the base 8. The compass construction utilized is well known in the art and suitable constructions are shown, for example, in the U.S. Pat. to White NO. 2,428,346 and in British Pat. No. 1,095,966.

In accordance with this invention, means is provided for illuminating the compass card. This means includes an arcuate housing 16 which is mounted by screws 17 on the flange 14 and which fits snugly against the bowl. Mounted between the housing 16 and the flange 14 is a rubber gasket 15. The arcuate housing includes opposite ends 18 which fit snugly against the compass dome. Intermediate of the housing and fitting snugly against the dome is a depending flange portion 19 having apertures 21 through which the screws 17 pass. Fitting snugly in recesses 20 provided on opposite sides of the depending flange portion on the housing 16 are screw threaded sockets 22 in which are mounted light bulbs 23. The sockets are connected by insulated wires 24 to a source of power such as a 12-volt DC battery. Each of the electric lights is preferably covered with a thin rubber cover 26 and preferably these covers are made of a red color to provide contrasting illumination of the printed compass card and greatly improve nonglare night vision. The overall length of housing 16 is such that it engages the housing over an arc of substantial size. In the device illustrated, the arc measures some 130° so that good illumination is provided for the compass card.

I claim:

1. Means for illuminating a compass card mounted for movement within a hemispherical compass dome, the dome having a flange extending horizontally above its equator, the illuminating means comprising an arcuate housing mounted on the compass flange and fitting snugly against the dome, the housing including a depending flange portion provided centrally thereof and fitting against the dome, and an electric light bulb mounted on the depending flange portion of the arcuate housing on each side thereof between the flange portion and an end of the arcuate housing for illuminating the compass card in the bowl.

2. A device as in claim 1 wherein the arcuate housing extends over a distance approximating a third of the diameter of the dome.